United States Patent [19]
Iwasaki et al.

[11] Patent Number: 6,087,031
[45] Date of Patent: Jul. 11, 2000

[54] POLYMER ELECTROLYTE AND PROCESS FOR PRODUCING THE SAME

[75] Inventors: Katsuhiko Iwasaki, Ehime; Taketsugu Yamamoto; Atsushi Terahara, both of Ibaraki; Michihisa Isobe, Tokyo, all of Japan

[73] Assignee: Sumitomo Chemical Company, Limited, Osaka, Japan

[21] Appl. No.: 08/997,547

[22] Filed: Dec. 23, 1997

[51] Int. Cl.[7] .................................................. H01M 8/10
[52] U.S. Cl. ................................ 429/33; 429/314; 521/33
[58] Field of Search ......................... 429/33, 314; 521/33

[56] References Cited

U.S. PATENT DOCUMENTS

| | | | |
|---|---|---|---|
| 3,528,858 | 9/1970 | Hodgdon et al. | 521/33 X |
| 3,972,840 | 8/1976 | Suzuki et al. | 521/33 X |
| 5,271,813 | 12/1993 | Linkous | 204/129 |
| 5,378,550 | 1/1995 | Doddapaneni et al. | 429/314 X |
| 5,403,675 | 4/1995 | Ogata et al. | 429/314 X |
| 5,523,181 | 6/1996 | Stonehart et al. | 429/314 |
| 5,795,496 | 8/1998 | Yen et al. | 429/33 X |

OTHER PUBLICATIONS

A. Linkous et al., Characterization of Sulvonic Acids of High Temperature Polymers as Membranes for Water Electrolysis, pp. 122–123. (1993)(Month Unknown).

*Primary Examiner*—Stephen Kalafut
*Attorney, Agent, or Firm*—Birch, Stewart, Kolasch & Birch, LLP

[57] ABSTRACT

A polymer electrolyte comprising a sulfonated polyethersulfone having an ion-exchange group equivalent weight of 870 to 5000 g/mol, which is obtainable by sulfonating a polyethersulfone having the structural unit represented by the following structural formula,

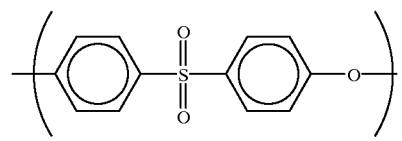

The polymer electrolyte is cheap, easily mold-processable by virtue of soluble property in organic solvent and thermoplastic property, easily film-processable, highly water-resistant, and suitable for a fuel cell.

7 Claims, 2 Drawing Sheets

POLYMER ELECTROLYTE AND PROCESS FOR PRODUCING THE SAME

BACKGROUND OF THE INVENTION

1. Field of the Invention

The present invention relates to a polymer electrolyte suitable for a fuel cell, a process for producing the same, and a fuel cell using the same.

2. Description of the Related Art

Due to recent attention to various environmental problems, a new energy technique has thus attracted special interests. It is such a fuel cell technique which is considered a promising new energy technique and it is anticipated that it will become one of the most important technology in the future. A polymer type fuel cell using a proton-conductive polymer as an electrolyte has attracted such special interest because of features such as good operation property at low temperatures, possibility of miniaturization and creating light, etc.

As a polymer electrolyte for a polymer type fuel cell, for example, Nafion (trademark of Du Pont Co.) as a ultrastrong acid group containing fluorinated polymer is known. However, Nafion is very expensive because it is a fluorinated polymer, and the control of water must be strictly followed because of its low water retention in the case of using it as a fuel cell. Furthermore, it is necessary when using a fluorine-containing compound to take the environment into consideration in respect to synthesis and disposal. Therefore, a polymer electrolyte of a non-fluorine proton-conductive material is desirable by today's market standard.

Some studies have already been made with respect to the non-fluorinated polymer-based polymeric proton-conductive material. In the 1950s, poly(styrenesulfonic acid) cation-exchange resins were examined. However, since the strength of a film which is the usual form at the time of using for a fuel cell was not enough, sufficient cell life could not be obtained.

A fuel cell using a sulfonated aromatic polyether ether ketone as the electrolyte has been researched. A detailed report on the synthesis of the sulfonated aromatic polyether ether ketone and its characteristics are disclosed in Polymer, page 1009, vol. 28 (1987). This report discloses that an aromatic polyether ether ketone (sometimes, referred to as PEEK), which is insoluble in organic solvent, becomes soluble in some organic solvent by highly sulfonating it, thereby facilitating film formation. The hydrophilic nature of these sulfonated PEEK has increased thus the water-solubility or a reduction in strength on water absorption occurred. When the water-solubility occurs, a fuel cell normally forms water as a by-product as a result of a reaction between fuel and oxygen, the sulfonated PEEK is therefore not suitable to use as an electrolyte for a fuel cell as it is. Japanese Patent Kokai Publication No. 6-93114 with respect to an electrolyte of sulfonated PEEK shows that an electrolyte having excellent strength can be obtained by introducing crosslinkable functional groups to a polymer and crosslinking the functional groups after film formation.

Polymeric Material Science and Engineering, 68, 122–123 (1993) and U.S. Pat. No. 5,271,813 disclose that sulfonated compounds of aromatic polyether sulfone can be used as aromatic polyether sulfone, etc.) can be utilized as an electrolyte of a device for electrolysis of water (UDEL P-1700 used as polyether sulfone is a polymer classified as polysulfone (sometimes, referred to as PSF)). However, there is no description about various physical properties such as primary structure or ion-exchange group equivalent weight of these sulfonated compounds of polymers. As PSF has the diphenylpropane unit in the repeating unit of the molecule which is easily sulfonated, it is difficult for the resulting sulfonated polysulfone not to dissolve in water because of its high water absorption.

Journal of Membrane Science, 83(1993) 211–220 discloses sulfonated compounds of PSF (UDEL P-1700) and PES. In the journal, it is described that the sulfonated PSF becomes completely water-soluble and the evaluation as an electrolyte cannot be performed. Moreover, about the sulfonated PES, although it is not water-soluble, introduction of crosslinking structure is proposed from the problem of its high water absorption.

These conventional techniques have problems such as expensive electrolyte, difficulty of structure controlling, lack of water resistance, insufficient strength, difficuly in production or mold processing, etc.

SUMMARY OF THE INVENTION

An object of the present invention is to provide a polymer electrolyte which is cheap, easily mold-processable by virtue of soluble property in organic solvent and thermoplastic property, easily film-processable, highly water-resistant, and suitable for a fuel cell. The present invention also provides an easily structure-controllable process for producing the polymer electrolyte, and a fuel cell of high efficiency.

As the result of intensive studies, the present inventors found that a film is easily formed by using a sulfonated polyethersulfone which is a heat-resistant polymer of comparatively cheap, thermoplastic and organic solvent-soluble, and the film can be used as an electrolyte suitable for a highly efficient fuel cell with maintaining the strength at the time of swelling by strictly controlling the degree of sulfonation.

That is, the present invention provides a polymer electrolyte comprising a sulfonated polyethersulfone having an ion-exchange group equivalent weight of 800 to 5000 g/mol, which is obtainable by sulfonating a polyethersulfone having the structural unit represented by the following structural formula.

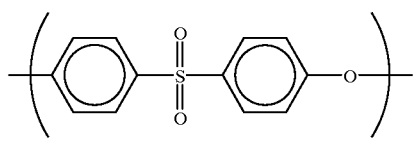

The present invention also provides a process for producing a polymer electrolyte comprising a sulfonated polyethersulfone having an ion-exchange group equivalent weight of 800 to 5000 g/mol by sulfonating a polyethersulfone having the structural unit represented by the above structural formula with a sulfonating agent.

The present invention further provides a fuel cell obtainable by using the said polymer electrolyte.

DETAILED DESCRIPTION OF THE INVENTION

Figure 1:
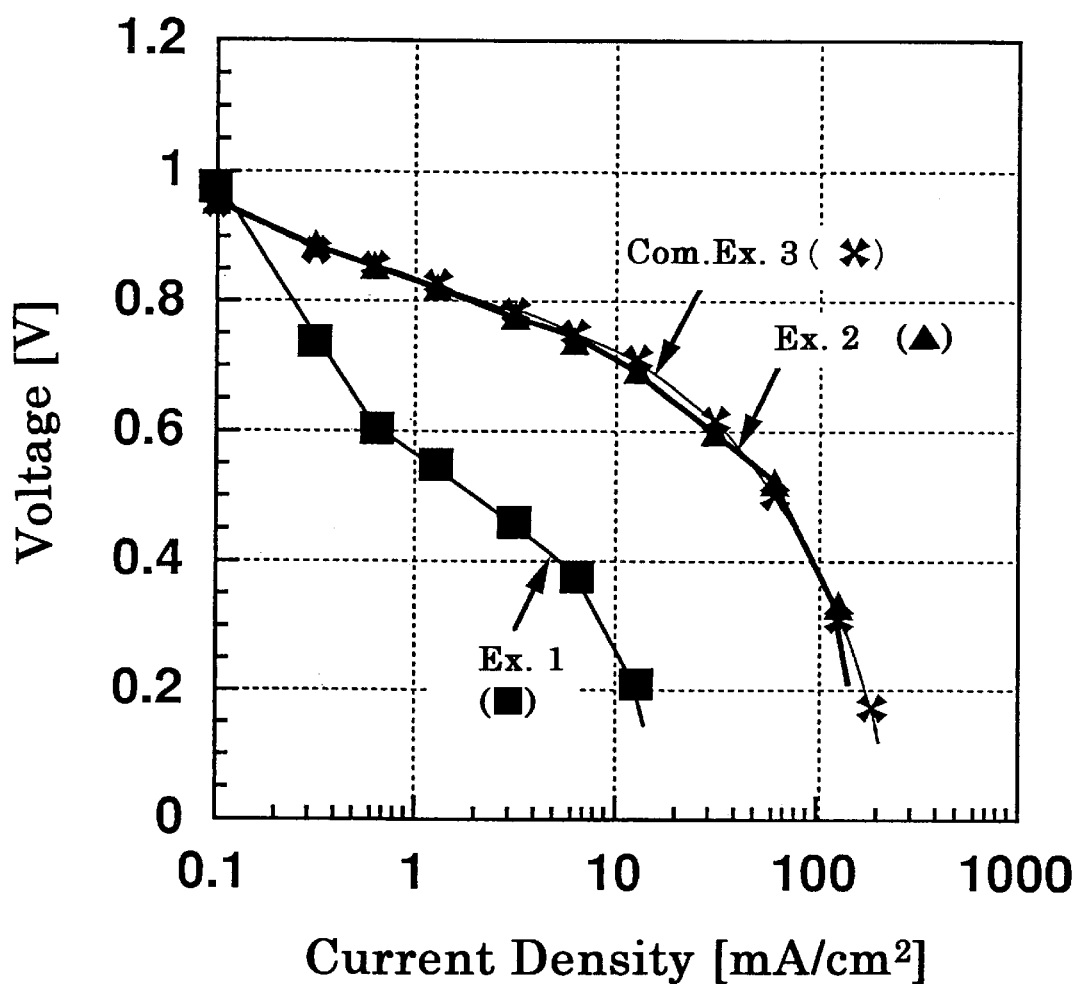
FIG. 1 is a graph of current density versus voltage illustrating a fuel cell output performance in Examples 1–2 and Comparative Example 3.

The present invention will be described in detail hereinafter.

Polyethersulfone (sometimes, referred to as PES) used in the present invention is a polymer having the repeating unit represented above. For example, SUMIKAEXCEL PES3600P, PES4100P, PES4800P and PES5200P (trademark of Sumitomo Chemical Co.,Ltd.) are exemplified.

The molecular weight of polyether sulfone is not especially limited. The weight average molecular weights is preferably 5,000–200,000, and more preferably 10,000–100,000. When the molecular weight is smaller than 5,000, the strength of the film obtained may become weak. When the molecular weight is larger than 200,000, mold processing may become difficult, and it is not preferable.

As a method of sulfonating the polyether sulfone, i.e. method of introducing sulfonic acid group into polymer chain, for example, methods described in Japanese Patent Kokai Publication Nos. 2-16126, 2-17571 and 2-208322 are known. There is described a method of sulfonating a polyethersulfone with a sulfonating agent such as chlorosulfuric acid or fuming sulfuric acid in concentrated sulfuric acid. The sulfonating agent is not especially limited as long as it can sulfonate polyethersulfone, and sulfur trioxide can be used besides the above.

When sulfonating polyether sulfone by this method, the degree of sulfonation is easily controllable by the amount of a sulfonation agent, the reaction temperature and the reaction time.

The degree of sulfonation is 800 to 5000 g/mol as an ion-exchange group equivalent weight, and preferably 1000 to 1500 g/mol.

When the ion-exchange group equivalent weight is lower than 800 g/mol, the water resistance and the strength at the time of water containing state are inferior. When the an ion-exchange group equivalent weight exceeds 5000 g/mol, the output performance is deteriorated, and not preferred.

The term "ion-exchange group equivalent weight" used herein means a molecular weight of the sulfonated polyethersulfone per mol of sulfonic acid groups introduced, and the smaller value means the higher degree of sulfonation.

The ion-exchange group equivalent weight can be measured, for example, by $^1$H-NMR spectroscopy, elemental analysis, non-aqueous titration (normal solution: benzene-methanol solution of potassium methoxide), etc. Among them, since measurement of ion exchange group equivalent weight is possible not depending on the purity of a sample, $^1$H-NMR spectroscopy is preferable.

It is preferable that the water absorption of polyether sulfone is 20% or less for a fuel cell. When the water absorption exceeds 20%, membranous mechanical strength may fall to produce a hole and may cause explosion, it is not preferable.

Water absorption here is an increased weight of sulfonated polyethersulfone after water absorption by being immersed in deionized water at 60° C. for 24 hours, compared to the sulfonated polyethersulfone dried. Water absorption is preferably 10% or less, more preferably 5% or less.

When the polymer electrolyte is used for a fuel cell, it is normally used in the form of a film. A method of converting the sulfonated polymer into a film is not specifically limited, but a method of forming a film from a solution state (solution casting method) or a method of forming a film from the molten state (melt pressing method or melt extrusion method) can be used. In case of the former, for example, a film is formed by casting and applying a N,N-dimethylformamide solution of a polymer on a glass plate, and removing the solvent. The solvent used for forming a film may be any one which can dissolves a polymer and is removed after coating. For example, there can be suitably used aprotic polar solvents such as N,N-dimethylformamide, N,N-dimethylacetamide, N-methyl-2-pyrrolidone, dimethyl sulfoxide, etc.; or alkylene glycol monoalkyl ethers such as ethylene glycol monomethyl ether, ethylene glycol monoethyl ether, propylene glycol monomethyl ether, propylene glycol monoethyl ether, etc.

The film thickness can be controlled by the solution concentration or thickness of coating onto the substrate. In case of forming a film from the molten state, the melt pressing method or melt extrusion method can be used.

Film thickness is not specifically limited, but is preferably from 10 to 200 μm. In order to obtain the film strength enough for practical use, the thickness is preferably thicker than 10 μm. In order to reduce the film resistance, i.e. improvement in generating performance, the thickness is preferably thinner than 200 μm.

In case of producing the electrolyte of the present invention, there can be used additives such as plasticizers, stabilizers, releasants, etc., as far as the object of the present invention is not adversely affected.

A method of bonding the electrolyte to an electrode in case of using as a fuel cell is not specifically limited, and a known method (e.g. chemical plating method described in Denki Kagaku, 1985, 53, 269, thermal press method of a gas diffusion electrode described in Electrochemical Science and Technology, 1988, 135 (9), 2209, etc.) can be applied.

EXAMPLES

The following Examples further illustrate the present invention in detail but are not to be construed to limit the scope thereof. The measuring conditions of the respective physical properties are as follows.

(1) Ion-exchange Group Equivalent Weight

After purifying and drying, polyethersulfone is dissolved in deuterized dimethylsulfoxide and and measured by 200 MHz $^1$H-NMR spectroscopy ( AC200P, manufactured by Bruker Co.).

By using the area (s) of the 8.2–8.5 ppm signals resulting from Ha in the following formula, and the area (S) of the 6.8–8.2 ppm signals resulting from the other aromatic proton (Hb, Hc, Hd, He) in $^1$H-NMR spectrum, the amount (x) of the introduced sulfonic acid group per benzene ring was calculated by the following formula (1).

Ion exchange group equivalent weight is calculated from the following formula (2).

$$s \div (S+s) = x \div \{4(1-x) + 3 \times x\} \quad (1)$$

$$[\text{ion exchange group equivalent weight}] = (232 + 80 \times 2 \times x) \div (2 \times x) \quad (2)$$

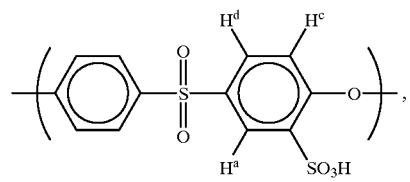

-continued

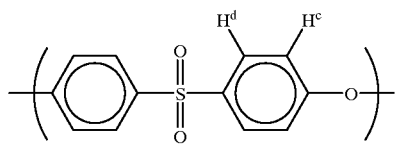

(2) Water Absorption (%)

Film after drying was and immersed in deionized water at 60° C. for 24 hours and allowed to absorb water. The increasing weight is shown as the water absorption in %.

(3) Output Performance of Fuel Cell

An electrolyte bonded with an electrode was incorporated into a cell to be evaluated, and the output performance of the fuel cell was evaluated. As a reaction gas, hydrogen/oxygen was used. After moistening by passing through a water bubbler at 23° C. under the pressure of 1 atm, the reaction gas was fed to the cell to be evaluated. A flow rate of hydrogen and that of oxygen were adjusted to 60 ml/min. and 40 ml/min., respectively. A cell temperature was adjusted to 23° C. The output performance of the cell was evaluated by using a charge/discharge test unit (H201B, manufactured by Hokuto Denko Co., Ltd.).

Example 1

Polyether sulfone Sumika Excel PES5200P (reduced viscosity of 1% N,N-dimethylformamide solution at 25° C.=0.52 dl/g) was dried at 100° C. under reduced pressure overnight. Dried polyether sulfone (25 g) and 125 ml of concentrated sulfuric acid were charged in a 500 ml round bottom flask equipped with a thermometer, a nitrogen introducing tube, a dropping funnel and a stirrer, and then stirred at room temperature under a nitrogen flow overnight to form an uniform solution. To this solution, 48 ml of chlorosulfuric acid was added from the dropping funnel while stirring under a nitrogen flow. Since chlorosulfuric acid reacts vigorously with water in concentrated sulfuric acid to perform the gas evolution for a while after the initiation of the dropwise addition, chlorosulfuric acid was slowly added dropwise. After the gas evolution becomes mild, the dropwise addition was terminated within 5 minutes. The reaction solution obtained after the completion of the dropwise addition was stirred at 23° C. for 6 hours to sulfonate the polyether sulfone. The sulfonated polyether sulfone was precipitated by slowly adding the reaction solution to 3 liter of deionized water, filtered and then recovered. A deionized water-washing operation using a mixer and a recovering operation using a suction filter were repeated until the wash becomes neutral, and then the polymer was dried under reduced pressure at 80° C. overnight. The ion-exchange group equivalent weight of the resulting sulfonated polyether sulfone was 2100 g/mol.

The resulting polymer dissolved in N-methyl-2-pyrrolidone was casted and applied on a glass substrate, dried under reduced pressure while slowly decreasing pressure at 80° C., followed by heating to 150° C. and further drying under reduced pressure for 3 hours to completely remove the solvent.

The resulting film was a pale brown transparent flexible film and had a thickness of 60 μm and a water absorption of 1 % or lower. The film was punched out to form a circle having a diameter of 30 mm φ and platinum black electrodes having a diameter of 20 mm φ were bonded by chemical plating method to the both sides of the film.

The chemical plating was performed by reducing 2 ml of 3 wt. % hexachloroplatinate aqueous solutions by 10 wt. % sodium borohydride aqueous solution on the both sides of the film. Then, the sulfonic acid group was protonated by 1 N hydrochloric acid, and washed with deionized water.

The resulting electrode-bonded polymer electrolyte was incorporated into the cell and the output performance of the fuel cell was evaluated. The resulting plot of current density versus voltage is shown in FIG. 1.

Examples 2–5

Synthesis and film-formation of sulfonated polyether sulfone were carried out as the same manner to Example 1.

Table 1 shows the sulfonation reaction conditions, ion exchange group equivalent weight of resultant polymers, and characteristics of the films formed from the N-methyl pyrrolidone solution. Film-formations were possible for all the resultant polymers in Examples 2–5.

The resultant polymer in Example 2 was bonded to electrodes as the same manner as Example 1. The resultant polymers in Examples 3 and 4 were bonded to gas diffusion electrodes by heat pressing, and evaluated. The bonding method is described below.

As the gas diffusion electrode, an electrode supporting platinum of 0.38 mg/cm$^2$ manufactured by U.S. E-TEK INC. was used.

The gas diffusion electrode punched out to have a diameter of 20 mm φ was made to impregnate uniformly 0.1 ml of 5 wt. % Nafion solution (lower alcohol - water mixed solvent, manufactured by U.S. Aldrich company) as bonding agent, and dried at 80° C. for 2 hours to remove the solvent. The electrodes were made to absorb water by being immersed for 2 hours in boiled deionized water together with the electrolyte.

After removing the water adsorbed on the surface, an electrolyte was sandwiched by two electrodes, as the catalyst side of the electrodes face to the electrolyte side. By pressing it at 80° C., 80 kgf/cm$^2$ for 90 seconds, an electrode-bonded polymer electrolyte was obtained.

Figure 2:
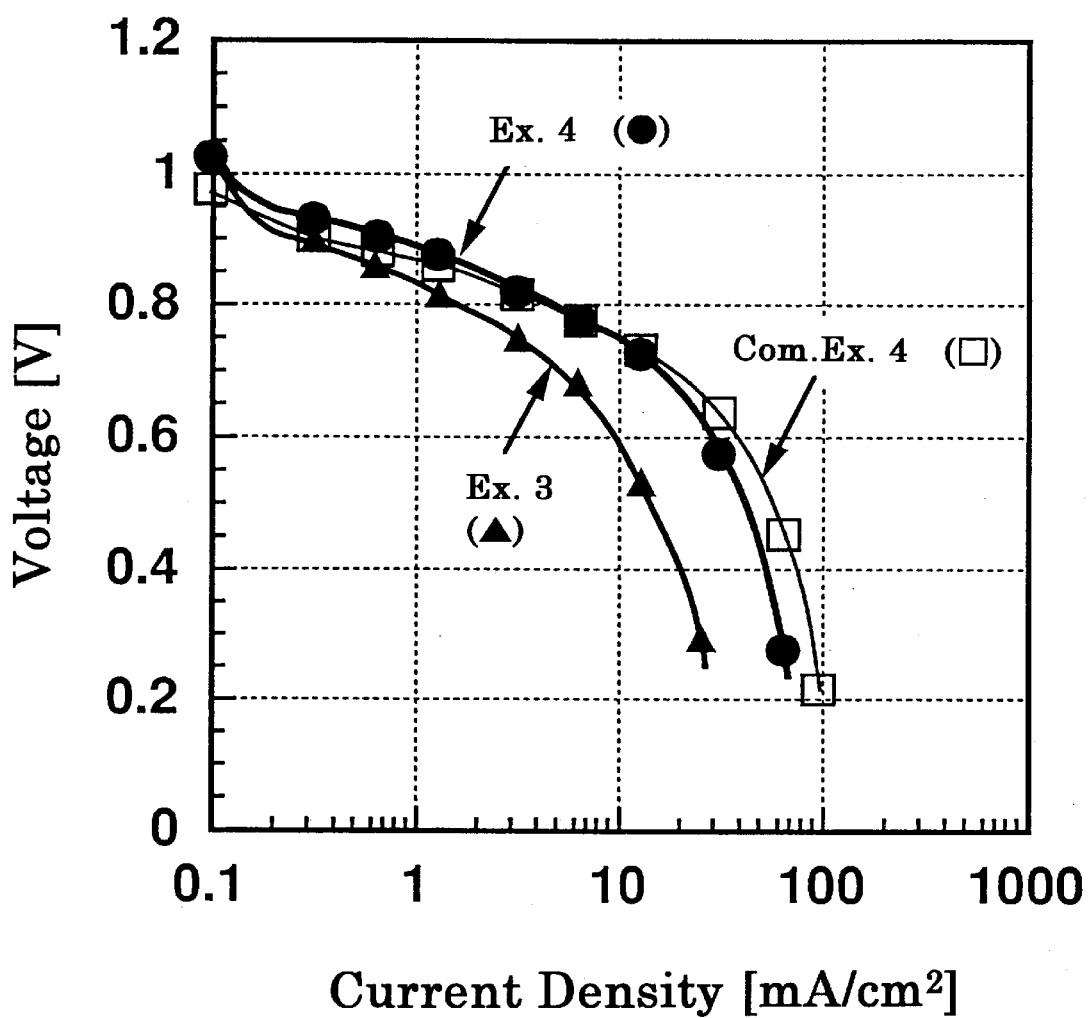
FIG. 2 is a graph of current density versus voltage illustrating a fuel cell output performance in Examples 3–4 and Comparative Example 4.

The fuel cell output performance of the resultant electrode-bonded polymer electrolyte was evaluated. FIG. 1 shows current density-voltage plot of an example 2. FIG. 2 shows current density-voltage plot of examples 3 and 4.

COMPARATIVE EXAMPLE 1

Chloro sulfuric acid was added dropwise to a concentrated sulfuric acid solution of polyether sulfone as the same manner as that of Example 1, and the reaction was conducted for 5 hours at a relatively higher temperature of 40° C.

Although film-formation was possible for the resultant polymer, the water absorption at 60° C. was 70%, and the water absorption at 25° C. was 13%. The film does not have a sufficient mechanical strength in water-containing state, and is not suitable as an electrolyte for a fuel cell.

COMPARATIVE EXAMPLE 2

Polyether sulfone was sulfonated at 40° C. for 6 hours as the same manner as that of Comparative Example 1. When charging the resultant reaction solution into deionized water, precipitates of a polymer were not obtained and the resultant polymer was water-soluble.

COMPARATIVE EXAMPLE 3

Output performance of the fuel cell was evaluated with using Nafion 117 film as an electrolyte. After punching out a Nafion film to 30 mm φ, it was immersed in 5% aqueous hydrogen peroxide at 100° C. for 30 minutes, then in 5% dilute sulfuric acid at 100° C. for 30 minutes, and washed well with deionized water of 100° C. Electrodes were bonded to the film after washing by chemical plating method shown in Example 1. Output performance of the cell was evaluated and the current density-voltage plot is shown in FIG. 1.

COMPARATIVE EXAMPLE 4

To Nafion 117 film processed as the same manner as that of Comparative Example 3, a gas diffusion electrode was bonded.

Output performance of the cell was evaluated and the current density-voltage plot is shown in FIG. 2.

TABLE 1

| | Reaction condition | | | Ion-exchange group equivalent weight (g/mol) | Film thickness (μm) | Water absorption (%) | Electrode bonding |
|---|---|---|---|---|---|---|---|
| | Chlorosufluric acid (ml) | Temp. (° C.) | Time (hour) | | | | |
| Example 1 | 48 | 23 | 6.0 | 2,100 | 60 | <1 | Chemical plating |
| Example 2 | 62 | 23 | 6.5 | 1,300 | 120 | <1 | Chemical plating |
| Example 3 | Polymer of Example 2 | | | 1,300 | 100 | <1 | Gas diffusion electrode/thermal pressing |
| Example 4 | 48 | 25 | 10 | 1,200 | 120 | <1 | Gas diffusion electrode/thermal pressing |
| Example 5 | 48 | 25 | 15 | 870 | 110 | 5.4 | |
| Comparative Example 1 | 48 | 40 | 5.0 | 720 | 80 | 70 | |
| Comparative Example 2 | 48 | 40 | 6.0 | — | — | | |
| Comparative Example 3 | Naphion 117 | | | 1,100 | 180 | 17 | Chemical plating |
| Comparative Example 4 | Naphion 117 | | | 1,100 | 180 | 17 | Gas diffusion electrode/thermal pressing |

As described above, according to the present invention, there can be provided a polymer electrolyte which is cheap, easily mold-processable by virtue of soluble property in organic solvent and thermoplastic property, easily film-processable, highly water-resistant, and suitable for a fuel cell. Moreover, the present invention also provides an easily structure-controllable process for producing the polymer electrolyte, and a fuel cell of high efficiency.

What is claimed is:

1. A polymer electrolyte comprising a sulfonated polyethersulfone having an ion-exchange group equivalent weight of 870 to 5000 g/mol, which is obtainable by sulfonating a polyethersulfone having the structural unit represented by the following structural formula,

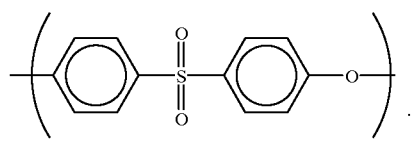

2. The polymer electrolyte according to claim 1, wherein the polymer electrolyte comprises a sulfonated polyethersulfone having an ion-exchange group equivalent weight of 1000 to 1500 g/mol.

3. The polymer electrolyte according to claim 1, wherein the water absorption at 60° C. of the sulfonated polyethersulfone is not higher than 20%.

4. A process for producing a polymer electrolyte comprising a sulfonated polyethersulfone having an ion-exchange group equivalent weight of 800 to 5000 g/mol by sulfonating a polyethersulfone having the structural unit represented by the following structural formula,

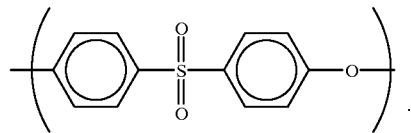

5. A fuel cell comprising electrodes and an electrolyte, wherein said electrolyte is the polymer electrolyte of claim 1.

6. The polyether sulfone according to claim 1, wherein the weight average molecular weight is 5,000–200,000.

7. The polyether sulfone according to claim 1, where the weight average molecular weight is 10,000–100,000.

* * * * *